United States Patent [19]

Lundquist

[11] Patent Number: 5,068,560
[45] Date of Patent: Nov. 26, 1991

[54] REDUCED CURRENT STARTING MECHANISM FOR THREE PHASE SQUIRREL CAGE MOTORS

[76] Inventor: Lynn Lundquist, 10833 NE. Russell, Portland, Oreg. 97220

[21] Appl. No.: 634,056

[22] Filed: Dec. 26, 1990

[51] Int. Cl.$^5$ ..................... H02K 17/18; H02K 17/16
[52] U.S. Cl. ..................................... 310/125; 310/211
[58] Field of Search ..................... 310/68 E, 125, 211, 310/212

[56] References Cited

U.S. PATENT DOCUMENTS

| | | | |
|---|---|---|---|
| 1,740,599 | 12/1929 | Johnson | 310/212 |
| 1,752,104 | 3/1930 | Myers | 310/212 |
| 2,196,059 | 4/1940 | Cox | 310/211 |
| 2,324,728 | 7/1943 | Schiff | 310/211 |
| 3,335,308 | 8/1967 | Robinson | 310/211 |
| 3,445,699 | 5/1969 | Beaudry et al. | 310/125 |
| 3,496,397 | 2/1970 | Andresen | 310/212 |
| 4,439,704 | 3/1984 | Adelski et al. | 310/211 |

FOREIGN PATENT DOCUMENTS 1534656  1/1990  U.S.S.R. ................. 310/211

Primary Examiner—Steven L. Stephan
Assistant Examiner—D. L. Rebsch

[57] ABSTRACT

A modification of the squirrel cage of an alternating current motor reduces the starting current amperage. A conventional motor squirrel cage, which includes rotor bars and shorting rings, is modified so that the cage may have two or more controllable resistance values by segmenting the shorting rings. A high resistance cage is obtained for initial motor starting when the open segmented shorting rings provide a high resistance path within the squirrel cage circuit. Subsequent to the motor's attaining full rotation speed, a low resistance value of the squirrel cage is achieved by shunting the segmented shorting rings, which gives the motor its optimum running efficiency. In one embodiment, a mechanical means is used to accomplish the shunting of the shorting rings. In a second embodiment, a solid state control device is used to accomplish the shunting of the shorting rings.

22 Claims, 6 Drawing Sheets

REDUCED CURRENT STARTING MECHANISM FOR THREE PHASE SQUIRREL CAGE MOTORS

BACKGROUND

1. Field of the Invention

This invention provides a modification to the rotor of a three phase, squirrel cage induction motor which allows the motor to be started at full line voltage with an appreciably lower current than is possible with a conventional rotor design.

This invention, in its preferred embodiment, is confined to the cage assembly and related parts of the rotor. No current or control voltage commutation to the rotor is required. No modifications are required to the electrical windings, the stator section, or the end bells.

The modification allows a NEMA class B or similar motor (that is, a normal torque, relatively low-starting current motor), to be direct line started (that is, started at full supply voltage) with a two hundred to three hundred percent or more reduction in starting current. A large horsepower, three phase motor could thus be direct line started at two hundred to three hundred and fifty percent of full load current rather than five to six hundred percent as is normally the case. After the internal change over to the running mode, there is no reduction in motor efficiency from that of a standard class B or similar motor.

This invention will, in many cases, alleviate the necessity of starting large motors with reduced voltage controllers.

2. Description of the Prior Art

A three phase squirrel cage induction motor has line-connected electrical windings in only the stator portion of the motor. A current is induced in the rotating rotor portion of the motor in much the same way that the primary windings in a transformer induce a current into the transformer secondary. In an alternating current, squirrel cage motor, the stator windings and stator steel act as the primary portion of the circuit, whereas the rotor steel and the cage act as the secondary portion of the circuit.

When the motor is at full operating speed, the revolving magnetic field produced by the stator cuts across the rotor conductor bars formed the cage, inducing a voltage in the cage conductor bars. The shorting rings on the ends of the rotor complete the path for the rotor current between the rotor conductor bars. This low induced voltage causes a high rotor current to flow. There is also a back emf (electromagnetic force) induced into the stator windings from the rotor which opposes the line current. The induced voltages in the rotor and the back emf in the stator windings produce an appropriate full load current on the incoming lines.

However, at start-up, a squirrel cage induction motor draws very high current because the induced voltages in the rotor are high and because there is negligible back emf opposing the stator current. Depending on load and motor design, the average starting current may be from four to six hundred percent of full load running current. This high current value during start-up is of considerable concern to both electrical installation engineers and electrical utility companies.

In present motor technology, attempts to reduce the starting current load fall into two broad catagories.

1. The cage portion of the rotor may be designed to reduce start-up line current. With a relatively simply design change of the cage bars which increases their resistance, the rotor reactance is altered, which reduces the starting line current. However, the result is a motor which has considerably less efficiency in full load operation. In most cases, the poor economics of the reduced efficiency offsets any advantages gained in reducing the starting current.

2. The most frequently used method of reducing high current on start-up of large induction motors is done with reduced voltage controllers. Reduced voltage controllers (or starters) will be one of five mechanisms used to reduce the voltage (or current) to the line taps of the motor. The five starter options include autotransformer starters, wye-delta starters, part winding starters, primary resistor starters, and solid-state starters. Though prices and installation complexity vary for each type of starter and application, each of the systems require high current starting gear which adds considerably to the cost of the installation and continued maintenance.

Whereas, in contrast to present motor technology, the modified squirrel cage of this invention achieves the reduction in starting current in a novel and economical way which eliminates the need for any reduced voltage starting equipment. The motor is direct line started at full voltage. However, the rotor has an internal regulating means which limits starting current during the rotor acceleration time period. After the rotor has reached approximate operation speed, the regulating means re-adjusts for normal operation.

This reduction in inrush current during starting is achieved by producing a rotor which has two or more resistance values for the rotor cage. At initial start-up, the resistance of the cage is at the highest value which limits the inrush current to acceptable levels. After the motor speed has stabilized, the rotor resistance is reduced to a level at which the motor runs efficiently for its most economical operation. Inasmuch as the rotor cage resistance can be altered at will, the cage may have higher design resistance resulting in a lower initial inrush current. At the same time, there need be no compromise in the normal operation efficiency of the motor.

A search of the body of information in the field indicates no prior claim for a segmented squirrel cage shorting ring (as will be defined later in the body of this description) for the purpose of achieving a variable cage resistance during motor running conditions. The segmented squirrel cage shorting ring relies on the high resistivity of the rotor steel to provide a high resistance squirrel cage for starting. After full motor speed is attained, the segmented squirrel cage shorting ring is shunted for low resistance running efficiency.

Within the prior art, various methodologies are employed to reduce the starting current of a squirrel cage induction motor. In the one case, an attempt is made to increase the resistance of the rotor bars by adding some resistive element, such as shown in Cox (U.S. Pat. No. 2,196,059) or Robinson (U.S. Pat. No. 3,335,308). In another methodology, the cross sectional shape and/or location of the rotor bar is altered to reduce starting current, such as illustrated by Schiff (U.S. Pat. No. 2,324,728), or Andresen (U.S. Pat. No. 3,496,397). In yet another methodology, some mechanical structure of the rotor is caused to physically change location in order to alter the reluctance of the rotor, such as shown by Johnson (U.S. Pat. No. 1,740,599) or Myers (U.S. Pat. No. 1,752,104). In a final methodology, an additional rotational element is introduced within the rotor such as described by Beaudry (U.S. Pat. No. 3,445,699).

None of the above prior art shows a segmented shorting ring, nor provides multiple and selectable, resistance values for the squirrel cage rotor. It is thus the intent of this description to show that the invention described herein is novel and provides advantages over all prior art in providing a reliable and uncomplicated means for reducing the starting current of a squirrel cage induction motor. This is accomplished by a segmented shorting ring in conjunction with a subsequent means of either mechanically or electronically causing the segmented sections to become electrically common.

OBJECTIVES OF THE INVENTION

This invention was developed with an understanding of the limitations of existing reduced voltage controllers when used for restricting the starting current load of large alternating current induction motors. Within industry today, there are reliable and effective units available which produce the desired electrical characteristics for reduced current starting of large alternating current induction motors. Their inherent disadvantage, however, lies in one of two areas. First, all such units appreciably add to the cost of an electric motor installation. Secondly, they add some form of external switching or voltage reducing equipment which occupies space—and requires installation—in addition to the actual electric motor.

With this understanding of the limitations of existing reduced voltage starting, it was the objective of this invention to overcome these and other limitations by developing the following characteristics in an alternating current, squirrel cage motor:

1. A primary objective was to develop an effective soft start motor in which all control functions were contained solely within the motor itself. That is, the motor could be wired for direct line starting with no external switching or control apparatus.

2. The motor would have minimal modifications, all of which (in the case of the preferred embodiment) would be confined to the rotor. The motor would have no modifications of either the end bell or the stator section. That is, the modification would be to only the rotor of an otherwise standard production motor.

3. The cost of the soft start motor would be substantially less than a comparable motor supplied with reduced voltage starting.

4. When compared to a reduced voltage started motor within its same class, the inrush current requirements of the soft start motor should be equal, or less, in the starting mode. Subsequently, the soft start motor should offer equal efficiency to the reduced voltage started motor in the running mode.

5. The soft start motor should provide a closed transition change from the starting to the running modes. That is, the line current of the motor should not fall to either zero or a value lower than full running current during the transition from the starting to the normal operation mode.

SUMMARY OF THE INVENTION

In its basic concept, the present invention is a motor which can be started by direct connection to full operating voltage without the excessive inrush current which is normally accompanied by such a starting condition. It is well known that the internal resistance of the squirrel cage of an alternating current induction motor influences both the motor efficiency while in normal operation, and the inrush current draw when starting. Unfortunately, with any fixed squirrel cage design, the low resistance characteristics which produce efficient motor operation at running speeds, produce high current starting conditions. Conversely, the high resistance of the squirrel cage which allows low inrush current during starting, results in inefficient motor operation at full speed.

In the novel approach to rotor design of this invention, a rotor has been produced which has a high resistance—and thus, a low inrush current—while the motor is starting, and yet can be altered to a low resistance condition—for efficient motor operation—when the motor reaches running speed.

As will be explained fully in the following sections, it was discovered that a normal rotor with an aluminum alloy squirrel cage can be altered to provide this multiple resistance characteristic. By segmenting a shorting ring (or both shorting rings) so that the rotor bar is not electrically connected to the adjacent rotor bars by said shorting ring(s), it has been established that the current path will subsequently flow through the higher resistance steel of the rotor. Thus, the high resistance squirrel cage obtained with the segmented shorting ring(s) results in a motor which will start with a substantially lower inrush current.

However, when the motor attains full operation speed, if the segmented shorting ring is shunted (or both segmented rings are shunted), the motor will run with the efficiency of a conventional motor.

Therefore, this invention has, in the first instance, developed a high resistance squirrel cage by segmenting the shorting ring(s) of the electric motor's rotor. In the second instance, this invention has devised a way of shunting the segmented rings, so that at full operation speed, the shorting rings—and hence, the entire squirrel cage assembly—has a substantially low resistance.

The first mechanism for shunting the segmented shorting rings is a novel mechanical arrangement which delays the shunting action until after the motor is at full speed. The second mechanism for shunting the segmented shorting rings is with a solid-state switching device and its related circuitry. The entire solid-state switching device and circuit is confined entirely to the rotor with no external commutation to the motor windings or frame.

DESCRIPTION OF THE PREFERRED EMBODIMENTS

Figure 1:
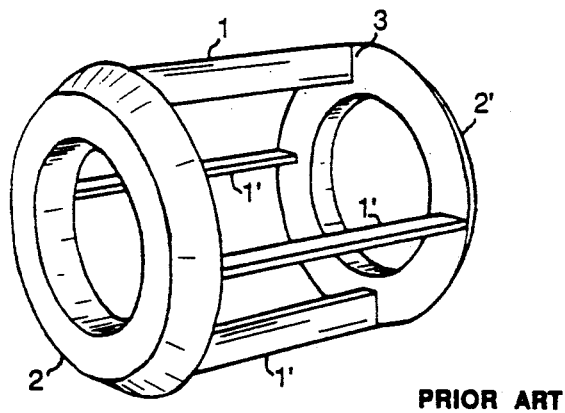
FIG. 1 shows a perspective view of a prior art conventional alternating current squirrel cage motor end rings and rotor bars. For this drawing, the number of rotor bars have been greatly reduced to simplify the visual presentation.

To simplify the description, symmetrical parts, or portions of a single part where divided by a sectional view, will be designated with a prime ('). The description of the part(s) having primed reference characters will be limited to a minimum.

Referring now to FIG. 1, the simplified details of a typical alternating current induction motor squirrel cage are shown. The cage consists of two components. First is the multiplicity of elongate rotor bars 1 which comprise the conductors of the rotor circuit. When the motor is running, the magnetic field produced by the motor windings cut across the rotor bars 1 which are imbedded in the motor armature steel, thus inducing a voltage in said rotor bars.

The magnitude of the voltage difference at the two ends of a given rotor bar 1 while in operation is quite small. In actual practice, a running motor may have a voltage potential as small as two hundredths (0.02) of a volt when measured across these points. On the other hand, considering the horsepower of any given motor, it will be apparent that the amperage carried by this same rotor bar 1 will be very high, inasmuch as power is a product of voltage and amperage.

For the induced voltage in the rotor bars 1 to produce effective work, they must be electrically linked together. This is accomplished by a pair of solid shorting rings 2; each ring is electrically common to all rotor bars 1 on a given end of the rotor.

The rotor bars 1 and shorting ring 2 assembly may be manufactured in a number of ways. Most commonly employed, however, is a cast aluminum alloy manufacturing process in which the rotor bars 1 and shorting rings 2 are cast integrally to the steel punchings of the motor rotor. It is thus apparent that the joint area 3 between the rotor bars 1 and the shorting rings 2 is attained with the lowest possible resistance value.

Because the voltage potentials within the cage assembly are only a fractional part of a volt, no additional insulation between the cage assembly and rotor steel is required other than the normally occuring oxidization layer found on the rotor steel. This oxidization layer is ample to insulate the working voltages in the cage assembly from the rotor.

In actual operation, the profile of the rotor bar 1 determines the starting and running amperage characteristics of the motor. Thus, a motor can be designed for a lower percentage of inrush current during starting. It should be apparent, however, that such a design modification is not variable during motor operation. Rather, a given rotor design has fixed starting and running characteristics.

For simplicity's sake, FIG. 1 does not show the full complement of rotor bars 1 which would normally be found in a rotor squirrel cage. Depending on the design of a given motor, the typical rotor cage could have some forty five rotor bars.

Figure 2:
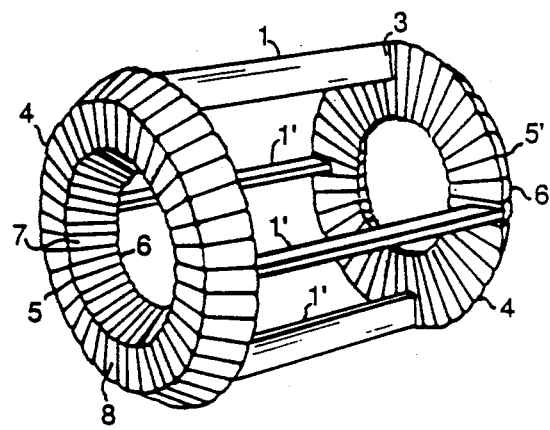
FIG. 2 shows the modified cage of this invention for an alternating current induction motor. The end ring is segmented so that each rotor bar and its accompanying end ring sections are an isolated electrical element. For this drawing, the number of rotor bars have been greatly reduced to simplify the visual presentation.

FIG. 2 illustrates the preferred embodiment of this invention. The general configuration of the rotor cage is similar to that of FIG. 1 with the individual rotor bars 1 and shorting rings. However, the shorting rings 4 are segmented at 5 between each consecutive rotor bar 1. Thus, the rotor cage is not an integral electrical circuit. Rather, it is composed of a series of rotor bars 1 and shorting ring segments 6, joined at 3 on each end, each of which is electrically isolated from either adjacent rotor bar 1 and shorting ring segments 5.

The increased resistance of each segmented shorting ring 4 is additive. That is, the total resistance is that of the sum of each low resistance ring segment 6 and high resistance area where the shorting ring 4 is segmented 5. Depending on the total resistance required for a particular motor design, a given rotor may have only one of two, or both, of said shorting rings with a segmented configuration.

In practice, the manufacture of the segmented squirrel cage may be identical to that of a conventional rotor in the aluminum alloy casting procedure. However, upon completion, the shorting rings are cut at 5 until the rotor steel is exposed. A narrow kerf at 5 is preferred.

As will be shown later, the segmented shorting ring 4 may be formed with a conical surface 7 which communicates with a shunt ring (to be shown in FIG. 6). For yet another application, the segmented shorting ring 4 may have a contact face 8 which is used for yet another shunting apparatus.

Figure 3:
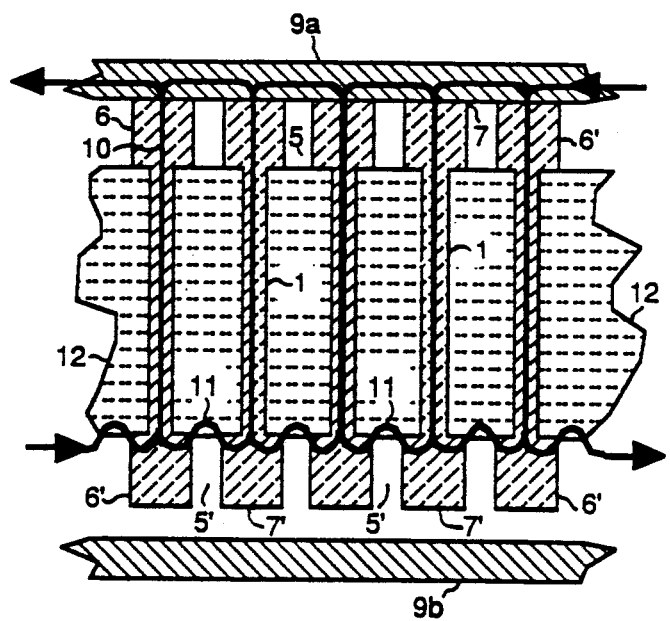
FIG. 3 is a diagrammatic representation of the current flow within the modified end rings and rotor bars of this invention when a mechanically shunted system is employed. The conditions of both a shunted and an open end ring are depicted.

Referring now to FIG. 3, it is possible to illustrate the function of the segmented shorting ring 4. With a closed shunt ring 9a making electrical contact with the conical surface 7 of the individual shorting ring segments 6, and electric current 10 can flow from the rotor bar 1 through the shorting ring segment 6 and into the closed shunt ring 9a. The electric current 10 from a given rotor bar 1 must travel 180 electrical degrees in the closed shunt ring 9a to a rotor bar corresponding with the opposite magnetic pole. This current path offers the least electrical resistance as the shunt ring 9 is constructed of a material with high electrical conductivity. Thus, a closed shunt ring 9a will provide the squirrel cage rotor with essentially the same electrical characteristics as the solid shorting ring 2 of FIG. 1.

However, with an open shunt ring 9b, the electric current 11 will flow from the rotor bar 1 to the shorting ring segment 6 but then must seek the only available higher electrical resistance path through the rotor steel 12. Since the electrical path 11 for each rotor bar 1 is to the point 180 electrical degrees away, the current path encounters high resistance as it travels between each successive shorting ring segment 6 and portion of rotor steel 12 in the segmented area 5.

Figure 4:
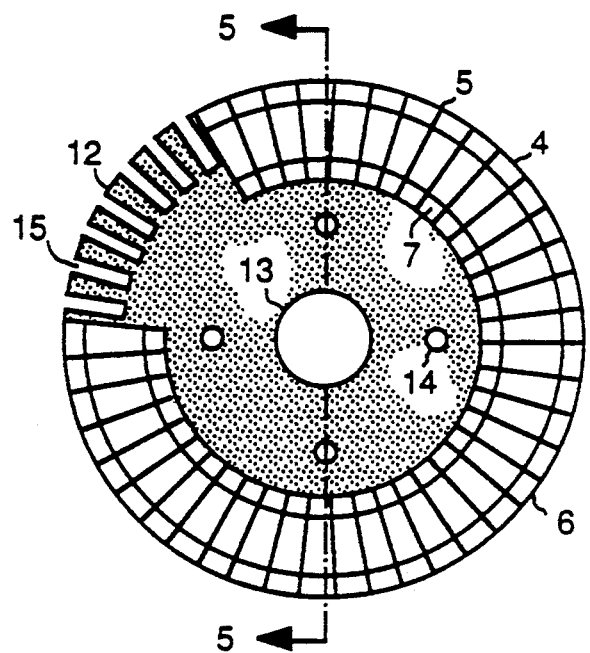
FIG. 4 is an end view of a modified squirrel cage rotor showing the segmented end ring. The figure also shows a partial view of the rotor's steel punchings with rotor bar slots.

FIG. 4 shows the detail of the segmented shorting ring 4. Individual segments 6 are formed by cutting (or otherwise forming) a narrow kerf at 5. In some applications an inner conical surface 7 is provided for a shunting ring 9 (not shown). In other applications, a contact face 8 may be formed for other means of providing an electrically conductive path.

The rotor shaft 13 is axially mounted within the rotor. Pull rod drillings 14 are provided for those applications in which a double acting mechanism (as illustrated in FIG. 6) is used.

The cut-away section shows the steel punching 12 of the rotor with the rotor bar slots 15 into which the rotor bars 1 are subsequently located.

FIG. 4 does not show any ventilation passages in the rotor steel. In most cases, they would be provided, as will be shown in FIG. 10.

Figure 5:
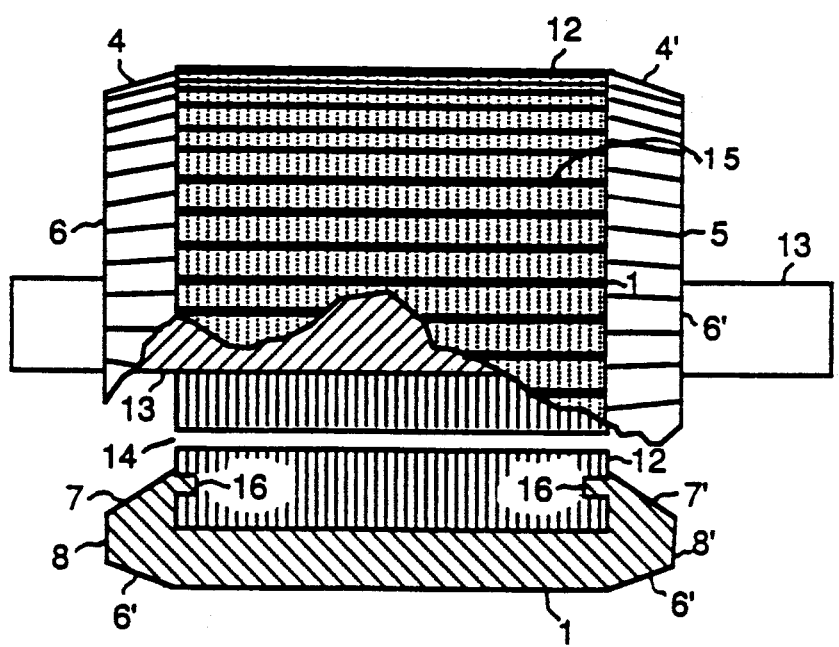
FIG. 5 is a side elevation partial sectional view of a modified rotor showing the segmented end ring sections and the integral rotor bars with portions broken away to show detail.

FIG. 5 shows the construction details of the entire rotor assembly taken along line 5—5 of FIG. 4. The rotor is comprised of a series of uniform steel punchings 12 mounted axially on the rotor shaft 13. The rotor bar slots 15 are so aligned in adjacent steel punchings 12 of the rotor that the cast aluminum alloy rotor bar 1 forms an electrical conductor parallel to the plane of the shaft 13 around the circumference of the rotor body. The rotor bar 1 is in electrical contact with the shorting ring segments 6 at either of the termination points of the rotor bar 1.

In certain embodiments, the inner portion of the segmented shorting ring 4 is formed as a conical surface 7 which is in communication with a movable shunt ring (shown in FIG. 6 as 9a and 9b) for the purpose of completing the electrical circuit between the segmented portions of said shorting ring. In yet another embodiment, the segmented shorting ring 4 has a contact face 8 for the purpose of completing the electrical circuit between the segmented portions of said shorting ring.

In certain instances, pull rod drillings 14 are provided to mechanically link components mounted on either shaft end of the rotor.

Because the mechanical integrity of the segmented shorting ring 4 is compromised by the kerf at 5, the steel punchings may include an anchor point 16 which assures a strong mechanical attachment between the assembly consisting of a rotor bar 1 and its shorting ring segments 6 and the rotor steel 12.

Figure 6:
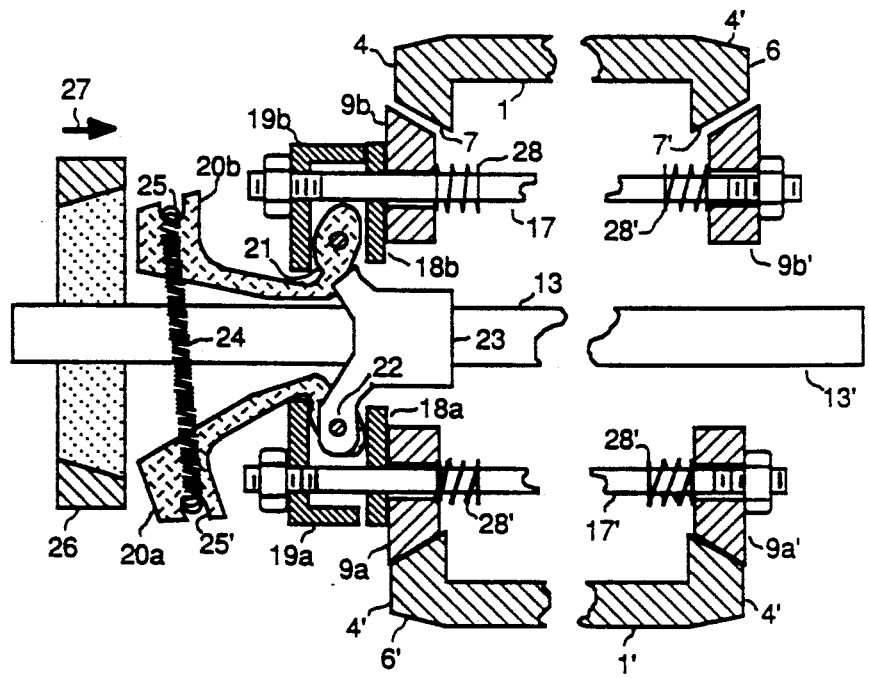
FIG. 6 is a view of a rotor shaft and partial sectional view of the related mechanical end ring shunting system.

FIG. 6 shows the details of a mechanical apparatus which is used to move the shunt rings 9 into electrical contact with the conical surface 7 of the shorting ring segments 6 for the purpose of completing the electrical circuit of the squirrel cage assembly. This apparatus is further designed so that there is a delay action until the motor is at full operating speed before said completion of the electrical circuit of the cage assembly.

A series of pull rods 17 mechanically connect the shunt rings 9 which make electrical contact with the segmented shorting rings 4. The pull rods 17 pass through an inner cam race 18, having inner cam race portions 19a, 19b, and an outer cam race 19, having outer cam race portions 19a, 19b, and are rigidly mounted to the outer cam race 19. The inner cam race 18 is adjacently located to the shunt ring 9 so that when the inner cam race 18 is moved away from the outer cam race 19 the shunt rings 9 are forcibly drawn toward each other into intimate contact with the conical surface 7 of the segmented shorting rings 4.

A plurality of flyweights 20, or mass, are mounted on the rotor shaft 13 in such a manner that when in the rest position, as indicated by flyweight 20b, the inner cam race 18b and the outer cam race 19b are in the relaxed position. However, as the flyweight, or mass, moves to the open position, as indicated by flyweight 20a, the inner cam race 18a and the outer cam race 19a are moved away from each other. By means of a mechanical linkage achieved with the placement of the inner cam race 18a against one shunt ring 9a, and the pull rod 17 against the opposing shunt ring 9a', said movement of the flyweight will cause the shunt ring 9a to become electrically conductive with the adjacent shorting ring segments 6. The flyweight 20, or mass, is so constructed with convex cam surfaces 21 and a pivot point 22 that movement of the flyweight 20a causes said separation between the inner cam race 18a and the outer cam race 19a.

Additional means are provided to delay the movement of the flyweights 20, or mass. The flyweight mounting spider 23 is rotationally unconstrained on the rotor shaft 13. When the flyweights 20b are in the rest position, the entire flyweight, or mass, assembly is free to rotate without restriction in relationship to the rotor shaft 13. If a frictionless needle bearing is used in the flyweight mounting spider 23 assembly, the rotor will reach full rotational speed before the flyweight 20a attains sufficient angular momentum to extend. A return spring 24 is mounted circumferentially on the flyweight 20 in a machined area at 25. A locking ring 26 may also be used to lock the flyweights 20 in the rest position until such time as the motor is at full operational loads. By causing the locking ring 26 to enclose the flyweight assembly as indicated by the direction of travel at 27, the flyweight assembly will remain rotationally stationary.

A break-away spring 28 is located on the pull rod 17 which exerts a force between the face of the rotor (not shown) and the shunt ring 9. Thus, when the flyweights 20b move to the closed position, the shunt ring 9 will move to the non-conductive position.

Figure 7:
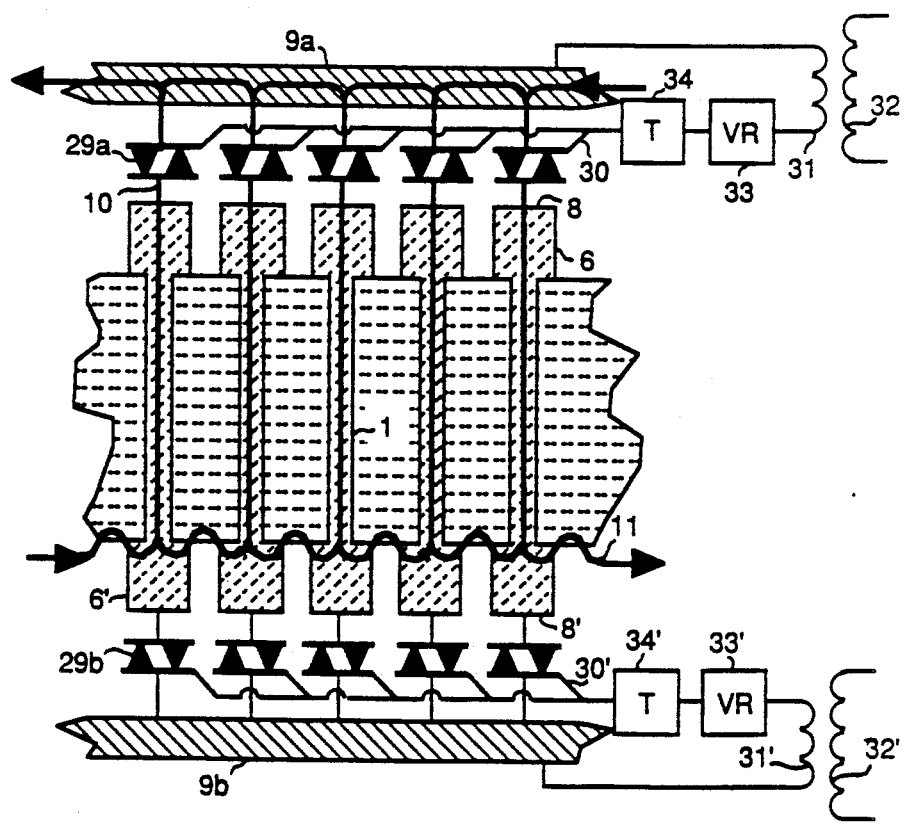
FIG. 7 is a diagrammatic representation of the current flow within the modified end rings and rotor bars of this invention when the solid-state switching device is employed. The conditions of both a shunted and an open end ring are depicted.

Referring now to FIG. 7, it is possible to illustrate the function of the segmented shorting ring 4 in the preferred embodiment when used in conjunction with a solid-state switching circuit 29. A semiconductor switching circuit 29 (which is typically a triac circuit) is located with the main terminals between the contact face 8 of the shorting ring segments 6 and the shunt ring 9. Thus, when a gate voltage is applied to the gate circuit 30, the solid-state switching circuit 29a becomes conductive and a current 10 flows between the shorting ring segment 6 and the shunt ring 9a. Inasmuch as all gates 30 of the solid-state circuit are connected in parallel, the entire solid-state circuit 29a will become conductive simultaneously.

When a current is not flowing through the solid-state switching circuit 29b, the circuit path will be through the high resistance labyrinth of the shorting ring segments 6 and the rotor steel 12.

The main current 10 which is controlled by the solid-state circuit is a voltage which is induced into the rotor squirrel cage rotor bars 1 by the revolving field of the stator. Thus, the main current 10 in the rotor is independent of, and needs no interconnecting circuit from, the rotor to the stationary part of the motor. (That is, there is no brush and slip-ring or commutator connection between the rotor and main motor frame.) Since it is desirable to maintain freedom from such a commutation system for any part of the control circuit, a self-induction control circuit has been build into the rotor. An exciter coil 31 is mounted on the rotor which is cut by the magnetic field of the motor stator windings 32. Thus, a gate control circuit 30 voltage is induced in the rotor circuit with no physical connection between the rotor and the main frame of the motor.

In order to be usable, the gate control circuit 30 voltage must be conditioned with a voltage regulating circuit 33 so that the gate control circuit 30 voltage does not exceed the allowable limits of the triac gate. Further, because a time delay is required so that the motor reaches full speed before the solid-state circuit 29a is conductive, a time delay circuit 34 is incorporated into the gate control circuit 30.

An initial start-up, it is desirable that the circuit between the shorting ring segments 6' and the shunt ring 9b remain nonconductive for a pre-determined period of time. This is accomplished by a set timing period in the time delay 34' circuit.

FIG. 7 is to be taken only as a schematic representation of the actual circuit.

Figure 8:
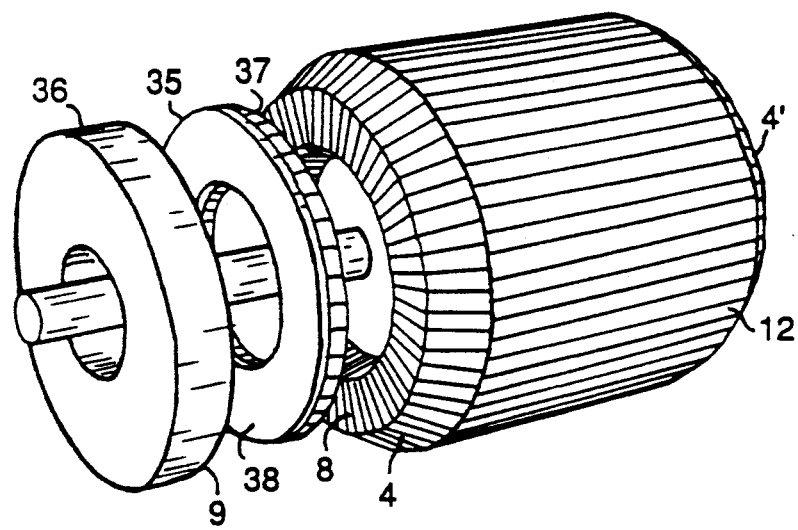
FIG. 8 is a perspective view of the rotor and shaft assembly showing the segmented shorting ring. A two-part shunt ring control system is shown which includes a solid-state shunt ring and the exciter coil unit.

FIG. 8 illustrates the solid-state two-part shunt ring control system which comprises a discrete solid-state shunt ring 35 and a separate exciter coil unit 36. In this configuration, a solid-state shunt ring 35 assembly is devised which consists of the solid-state circuit 29 of FIG. 7. The solid-state shunt ring 35 has two faces (37 and 38) which represent the main terminals of a solid-state switching device. (Typically, the switching device is a triac.) One such face (not visible, but indicated at 37) is mounted so that one of the series of solid-state switching terminals (not identified) aligns, and is in electrical contact, with a shorting ring segment contact face 8. At the same time, the opposing face 38 of the solid-state shunt ring is in electrical contact with the conductive shunt ring 9 portion (hidden from view) of the exciter coil unit 36. Thus, when the solid-state circuit 29a (as indicated in FIG. 7) becomes conductive, there is a current flow 10 from the contact face 8 of the shorting ring 4 to the shunt ring 9 portion of the exciter coil unit 36. Conversely, if the solid-state circuit 29b (as indicated in FIG. 7) is non-conductive, there is no current flow across the solid-state circuit 29b and the current path will be through the high resistance 11 portion of the circuit.

This perspective view (FIG. 8) does not attempt to show detail of the exciter coil unit 36. In practice, the exciter coil unit 36 would include the voltage regulating 33 and timing 34 circuits as well as the exciter coils 31 indicated in FIG. 7. Additionally, rotor cooling is required (which includes the rotor squirrel cage proper and the additional circuitry of the exciter coil and solid-state shunt ring 35). In all likelihood, this would necessitate cooling fan blades (not shown) on the exciter coil unit 36, or other air circulating provisions in the motor.

Figure 9:
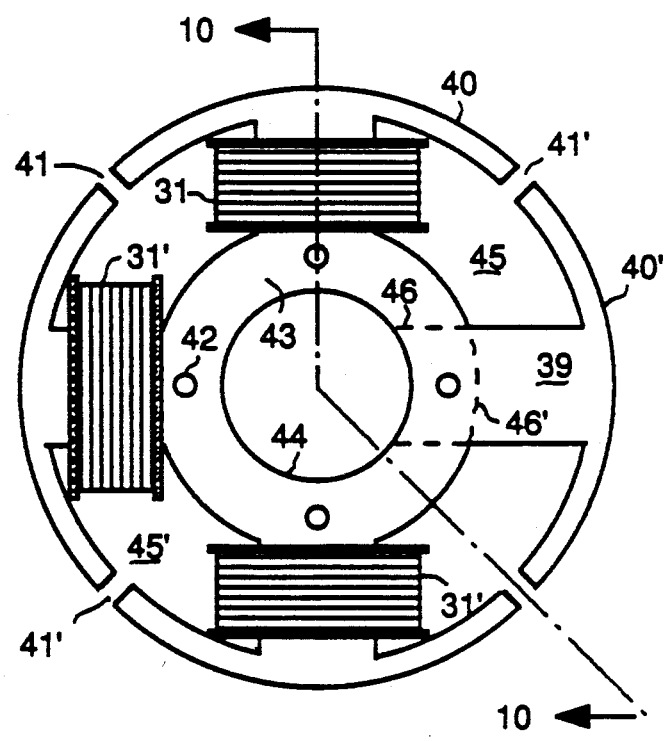
FIG. 9 is an end view of an open exciter coil unit showing the steel armature section and a partial set of mounted coils.

FIG. 9 illustrates an open exciter coil unit showing the steel armature 39 and a partial set of mounted exciter coils 31. A plurality of coils 31 are used, which, in most cases, consists of opposing pairs of coils which are 180 electrical degrees apart. The exciter coils 31 may be connected in series (for additive voltages) or parallel (for additive current) depending on the needs of the gate control circuit 30 shown in FIG. 7. The armature steel 39 is constructed so that the pole shoe 40 has an optimum arc area. This is accomplished by constructing the pole shoe 40 with a minimally sized gap 41 between adjacent pole shoes 40. In this manner, the exciter coil 31 is exposed to the optimum available magnetic saturation.

The design of the exciter coils 31 and armature steel 39 demands great care inasmuch as the magnetic field in which the exciter coil unit 36 is rotating has a weak magnetic flux. The entire exciter coil unit 36 is mounted outside of the stator steel (not shown) of the motor. Only the magnetic lines of force from the coil ends (that is, the portion of stator winding outside the stator steel which is approximately perpendicular to the shaft) are cutting the armature steel 39 of the exciter coil unit 36. Though far greater magnetic density is available within the steel encased portion of the stator, this area is not used in order to avoid compromising the efficiency of the motor.

The assembly of the exciter coil unit 36 and the solid-state shunt ring 35 must be rigidly mounted against the contact face 8 of the rotor. Tie rod holes 42 are provided which allow a series of tie rods (not shown) to compress the assembly comprised of the exciter coil unit 36 and the solid-state shunt ring 35 into close electrical contact with the shorting ring segments 6. Good contact is required to assure both electrical and thermal conductivity.

The inner ring 43 of the armature steel 39 provides the magnetic return path for the magnetic flux when opposing pole shoes 40 are aligned with any north-/south magnetic pole condition. As will be shown in FIG. 10, the opening 44 in the center of the armature steel 39 provides a ventilation channel for rotor cooling air.

Additional space in the exciter coil unit 36, such as that indicated by 45, may be used for the voltage regulation 33 or timing 34 circuits shown in FIG. 7. Because the exciter coil unit 36 is exposed to high angular velocities and centrifugal force stresses, all components within the unit are, in all likelihood, epoxy potted.

There is no attempt to show all construction details of the armature steel 39 in this disclosure. However, it would be suggested that the armature would comprise a series of thin laminates to reduce hysteresis losses. In so doing, it would also be possible to alternate laminate shapes as indicated by the dotted lines at 46, so that the coils 31 could be wound before assembly on the armature steel 39.

Electrical connections between the exciter coils 31 and other portions of the circuit are not shown.

Figure 10:
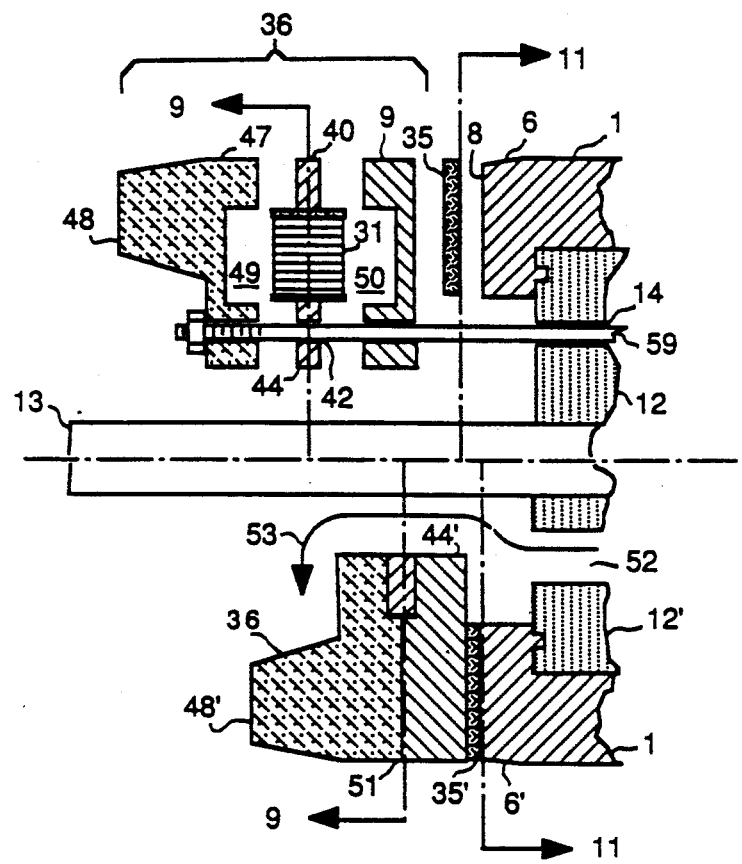
FIG. 10 is a sectional view of line 10—10 from FIG. 9, in which the details of a shunt ring exciter coil unit and a solid-state shunt ring control are illustrated. Details of the rotor cooling fan are also shown. The upper portion of the drawing shows an exploded view of the exciter coil unit and solid-state shunt ring control; the lower portion of the drawing shows the assembly in the operating position.

FIG. 10 demonstrates the assembly of a shunt ring exciter coil unit 36 comprising the exciter coils 31, the armature steel, as seen in the pole shoe 40, the fan shell 47, and the shunt ring 9. The view also shows the location of the solid-state shunt ring 35. Fan blades 48 are integrally cast on the face of the fan shell 47 to aid in ventilation. The fan shell 47 and the shunt ring 9 are most frequently constructed of an aluminum alloy which has desirable electrical and heat conductivity qualities. Both the fan shell 47 and the shunt ring 9 have hollowed areas (49 and 50 respectively) to accommodate the coil 31, the armature steel (the complete armature is shown as 39 in FIG. 9), and any necessary control electronics (voltage regulator 33 and timer 34 in FIG. 7) and conductors. In those areas which have no internal components, the fan shell 47 and the shunt ring 9 are brought into intimate contact as shown at 51. To insure proper heat transfer, contacting surfaces as in 51, may be coated with a thermal conductive paste. To further aid heat transfer to the cooling fan 48 area, the cavity (49 and 50) between the coil 31 and housing members may be pressure filled with an epoxy with desirable thermal conductivity properties.

The fan shell 47 has fan blades 48 cast radially on its front surface. The fan blades 48 are identical in shape and function to those which would normally be found on the shorting ring 2 of any conventional rotor.

The entire soft start assembly, which consists of the exciter coil unit 36 and solid-state shunt ring 35, is located solidly against the contact face 8 of the segmented shorting ring 4 by means of tie bars 59 which pass through the rotor steel 12 at 14 and the exciter coil unit 36 at 42.

In most rotor applications, air flow passages are supplied in the rotor for cooling purposes. In the design of this invention, an enlarged shaft opening is provided through the exciter coil unit 36 at 44 and the solid-state shunt ring 35 so that the ventilating air can flow through the rotor ventilation passages 52 and over the fan blade 48 as indicated by the air flow arrow 53.

Figure 11:
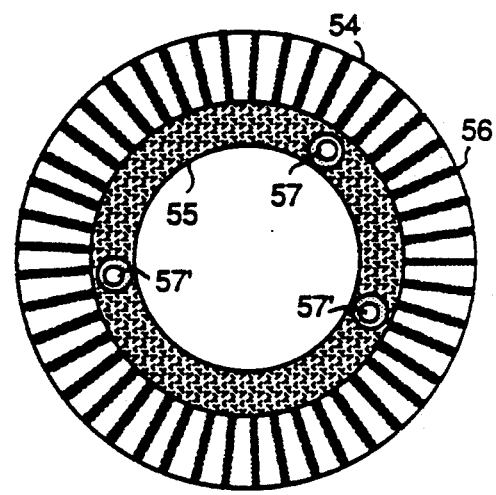
FIG. 11 is an end view of the solid-state shunt ring and the means for conductively mounting said ring to the exciter coil unit viewed from line 11—11 of FIG. 10.

FIG. 11 is an end view of the solid-state shunt ring assembly 54 (generally a triac as represented by 29 in FIG. 7) portion of the shunt ring 9 and the means for conductively mounting said ring to the exciter coil unit. The solid-state shunt ring assembly 54 consists of a series of discrete switching devices (triacs) arranged radially on the periphery of a conductive mounting plate 55. The solid-state circuit is so arranged that each discrete switching element is in electrical contact with a shorting ring segment 6 on the contact face 8 of the rotor. The separation gap 56 between the switching segments is both an insulating means and an air flow passage for circuit cooling. A plurality of mounting holes 57 is provided on the mounting plate 55 for the purpose of fixedly locating the solid-state shunt ring assembly 54 element on the shunt ring 9. The mounting holes 57 are located on the mounting plate 55 asymmetrically so that the solid-state shunt ring assembly 54 unit will be located in a single, specified position. Inasmuch as it is necessary to electrically connect the gate circuit 30 to the switching elements 29 (as indicated in FIG. 7) the surface surrounding the mounting holes 57 is used as a terminal lug for each appropriate circuit function. This is achieved by provided an insulated, conductive element around each mounting hole 57 which is electrically connected to its respective circuit in the solid-state shunt ring assembly 54 element, and providing similarly insulated conductive threaded holes (not shown) in the shunt ring 9 which are in electrical contact with a similar circuit in the exciter coil unit 36.

Figure 12:
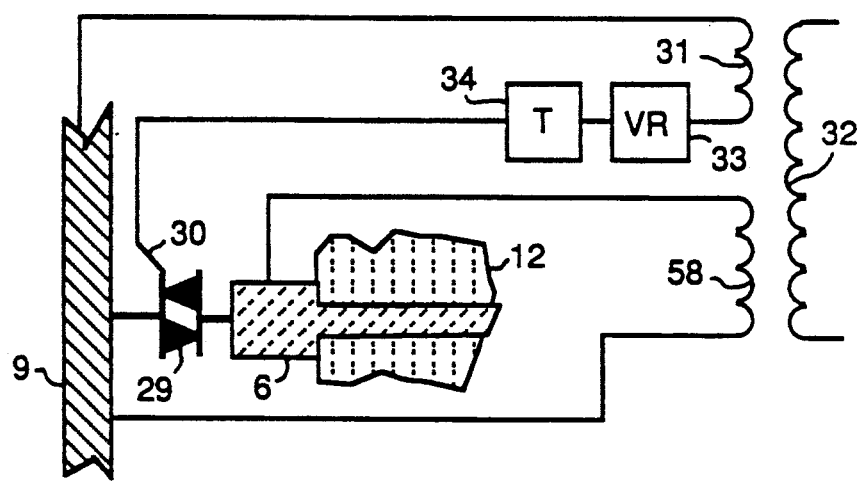
FIG. 12 is a diagrammatic representation of a supplementary carrier circuit which elevates the voltage across the solid-state switch device above its forward voltage threshold.

FIG. 12 represents a supplementary circuit arrangement in which a carrier of sufficient forward voltage magnitude is supplied to the solid-state switching circuit 29 to cause conductivity. A typical open voltage between the shorting ring segment 6 and the shunt ring 9, when the rotor is at full operational speed, is approximately 0.02 volts. (That is, two one-hundredths of a volt.) A typical triac, which consists of paired silicon control rectifiers, has a typical lower forward voltage threshold of approximately 0.5 volts. (That is, one-half volt.) Thus, the high amperage, low voltage current between the shorting ring segment 6 and the shunt ring 9 is of insufficient voltage magnitude to trigger the switching circuit 29 to a conductive state. By adding a carrier voltage coil 58 and conductors to both main terminals of the triac at the shorting ring segment 6 and the shunt ring 9, a voltage above the threshold of the switching circuit 29 brings said switching circuit to a conductive state. In the conductive state, the switching circuit 29 will then carry the low voltage, high amperage current of the rotor squirrel cage between the shorting ring segment 6 and the shunt ring 9. The exciter coil 31 and its related circuitry (voltage regulator 33, time delay circuit 34, and gate control circuit 30) remain as described in FIG. 7.

FIG. 12 is to be taken only as a schematic representation of the actual circuit.

OPERATION

The reduced current starting means of this invention is achieved by an induction motor rotor cage with two or more resistance values which are selectable during motor operation. Thus, the motor does not have the fixed running characteristics normally associated with an alternating current squirrel cage induction motor.

Motor torque and slip—and thus the motor's efficiency—are directly related to cage resistance. As would be expected, when the motor of this invention starts with the condition of a high cage resistance, slip (which is the deviation from synchronous speed) is increased and torque is reduced. Both of these alterations, however, result in the low starting current of this motor design.

When the motor has fully transitioned to the running mode, the cage resistance is low and the motor runs with the slip and torque characteristics of a standard motor of its class. That is, the efficiency of the motor is returned to normal operating parameters. Total transition time will depend on the specific application of the motor. However, most transition times from starting mode to full operational efficiency would be less than four seconds.

In the preferred embodiment, illustrated in FIG. 2, it is evident that the electrical path of greatest conductivity between the rotor bars 1 is compromised by the segmented shorting rings 4. As is further demonstrated in FIG. 3, this causes the electric current 11 to flow alternately between the shorting ring segment 6 and the rotor steel 12. The cage resistance is thus greatly increased, which reduces the inrush current of the motor during starting.

It should also be evident from FIG. 3 that by placing a low resistance conductor—such as the shunt ring 9a—in electrical contact with all shorting ring segments 6, a low resistance current path 10, which is necessary for high efficiency motor operation, will be provided.

Thus, it should be obvious from the teaching herein that by providing a rotor with segmented shorting rings 6 on either extremity of the plurality of rotor bars 1, and with each of said segmented shorting rings in controlled electrical contact with a corresponding shunt ring 9, it is possible to control the resistance of the rotor cage, and thus the starting current characteristics of the motor. Further, it can be shown that incremental control of the cage resistance—and thus starting current—is possible. If, at initial starting, both segmented shorting rings 4 are electrically open, the rotor cage will have the highest resistance value, and the motor will start with a greatly reduced inrush current. As motor speed increases, one of the two shunt rings 9 may be brought into electrical contact with its adjacent segmented shorting ring 4 which will increase motor efficiency. Finally, at full motor speed, the second of two shunt rings 9 may be brought into electrical contact with its adjacent segmented shorting ring 4, bringing the motor to full operational running conditions. Inasmuch as the shunt rings 9 are brought into electrical contact with their respective segmented shorting ring 4 while the motor is at some intermediate or final rotational speed, the high inrush currents associated with locked rotor starting are eliminated.

The electrical characteristics of the motor's starting current requirements are unaffected by the means used to shunt the segmented shorting rings 4. Thus, in the one preferred embodiment, as shown in FIGS. 7, 8, 10, and 12, the segmented shorting rings 4 are caused to make electrical contact with their respective shunt ring 9 by means of a solid-state switching circuit 29. The switching circuits 29 are integrated into a solid-state shunt ring device 35, as shown in FIG. 8.

Further controls can be added to the circuitry of the single solid state shunt ring 35 so that the switching intervals of the individual solid-state switching circuit 29 devices are incremental. Thus, a single segmented shorting ring can be shunted progressively wherein only portions of the squirrel cage circuit are closed at a given time. This allows the cage resistance to be reduced in steps which prevents inrush current surges during the starting procedure.

In order to power the solid-state circuit 29 without the addition of commutation means (that is, brushes and slip rings) on the rotor shaft, a source of a control voltage is required on the rotor itself. As shown in FIG. 9, a novel exciter coil 31 circuit has been devised which rotates within the magnetic field of the stator coil ends. The rotating magnetic field of the stator coils (shown as 32 in FIG. 7) cut the conductors of a series of exciter coils 31 and their related steel armature 39. This assembly is located on the end of the rotor outside of the stator steel of the main motor. Though the efficiency of this arrangement is less than it would be within the steel portion of the stator, it is preferred, inasmuch as using an active stator section of the motor poles would reduce the output efficiency of the motor.

As shown in FIG. 7, the exciter coil unit 36 incorporates a related control circuit which includes both a voltage regulating circuit 33 and a time delay circuit 34. The voltage regulating circuit 33 is necessary, inasmuch as the high current acting on the rotor when it is stationary would damage the triac gate 30 from the high induced voltage. The time delay circuit 34 allows the circuit to be closed (or regulated) at any predetermined time after the motor has attained full speed running conditions. In this way, progressive reduction of rotor resistance is achievable.

In practice, the exciter coil unit 36 as shown in FIG. 10, and the solid state shunt ring assembly 54 as shown in FIG. 11 are modular. The exciter coil unit 36 is assembled so that contacting surfaces 51 will conduct heat to the cooling fan blades 48. In all likelihood, the exciter coil unit would not be serviceable since it would be an assembled unit. The solid state shunt ring assembly 54 would be interchangeable when service for damaged triacs was required. In some cases, the voltage regulation 33 and time delay circuits 34 may be built into the solid state shunt ring assembly 54 since this assembly is more easily replaced when service is required.

Voltages encountered in the cage assembly circuit (that is, the voltage between the opposite ends of the rotor bars 1), are typically below the threshold levels of the solid state switching devices (triacs) commonly employed for this type of switching function. A running motor may have a rotor cage voltage potential as small as two hundredths (0.02) of a volt, whereas the forward voltage requirements of a silicon semi-conductor device will seldom be less than one-half (0.5) a volt. Consequently, a carrier voltage circuit was devised to provide a sufficiently high potential to switch the device to a conductive state. Preliminary circuit experimentation indicates that the carrier voltage circuit shown in FIG. 12 accomplishes this task. Even though it is of a small amperage magnitude, the carrier circuit voltage is sufficiently above the threshold limit of the solid-state switching circuit 29 that the switching circuit 29 will switch to a conductive state. While in the conductive state, the switching circuit will conduct the low voltage, high amperage, working current between the rotor bar 1 and the shorting ring segment 6.

In a second embodiment shown in FIG. 6, a mechanical means for shunting the segmented shorting rings 4 is shown. In this configuration, two shunt rings 9 are provided at either extremity of the rotor bars 1, and are so manipulated that the shunt rings are brought into electrical contact with the conical surface 7 of the shorting ring segments 6. This action, which brings the shunt rings 9 into electrical contact with the shorting ring segments 6, is achieved by a flyweight 20, or mass, system with convex cam surfaces 21 positioned between an inner cam race 18 and an outer cam race 19 in such a manner that the cam races are forced apart and, in turn, draw the two shunt rings 9 toward each other by means of a series of pull rods 17.

Only a small clearance is required between the conducting surfaces of the segmented shorting rings 4—which is provided on the conical surface 7—and the shunt ring 9 in order to break electrical contact. Thus, the total travel of the shunt ring 9 between its closed and open positions may be as little as three to five thousandths (0.003 to 0.005) of an inch. It should thus be apparent that the mechanical advantage of the flyweight convex cam surfaces 21 against the inner 18 and outer cam race 19 is such that a small displacement with a large force is the objective of the action.

A novel feature of the flyweight 20, or mass, design is in its free-wheeling feature. The flyweight mounting spider 23 is located, in this preferred embodiment on the rotor shaft 13 by means of anti-friction (needle) bearings. Further, a minimal clearance between the convex cam surfaces 21 and the inner 18 and outer 19 cam races is maintained when said flyweights are in the relaxed position so that the entire flyweight assembly is free to remain stationary while the rotor shaft 13 commences to accelerate. The return spring 24 assures that the convex cam surfaces 21 are not in physical contact with the cam races 18 or 19 while the flyweights 20, or masses are in the rest position. Only after the rotor is at full speed does the flyweight assembly attain sufficient angular momentum to mechanically act upon the cam races. Thus, there is a time delay action which allows the motor to reach full operating speed before the shunt rings 9 reduce the resistance of the rotor cage.

The time delay action may be further delayed by the installation of a locking ring 26. Locking ring 26 may be so mounted on the end bell (not shown) of the motor that until a certain speed or time interval is attained, the locking ring is moved to the forward position (as indicated by the direction of travel at 27 in FIG. 6) and prevents the flyweight 20, or mass, from rotating. It should thus be apparent that as long as the locking ring 26 is in the forward position 27 the rotor cage will remain in the high resistance starting condition. A solenoid coil arrangement (not shown) may be used on the motor end bell to position the locking ring. The solenoid coil may be either time or current actuated on start-up only.

A progressive control of the rotor cage resistance is possible by providing break-away springs 28 with varying compressive strengths. If a set of break-away springs 28 controlling one shunt ring 9 is of considerably less or greater strength than said break-away springs on the opposite shunt ring 9, the shunt rings 9 will make electrical contact at different intervals. Thus, the resistance of the rotor cage will step to its lowest resistance, which in turn, will cause the starting current to adjust incrementally.

At shut-down of the motor, it is important that the shunt rings 9 break electrical contact with the conical surface 7 of the segmented shorting rings 4. The break-away springs 28 force the shunt rings 9 away from the electrical contact when the flyweights 20 are in the rest position, thus restoring the cage rotor to its highest resistance condition.

While the present invention has been described in conjunction with two particular embodiments, it is to be understood that various modifications and other embodiments of the present invention may be made without departing from the scope of the invention as described herein and as claimed in the appended claims.

The embodiments of the invention in which an exclusive property or privilege is claimed are defined below.

What I claim is:

1. A rotor cage assembly for an alternating current motor including a rotor steel, comprising:
   a segmented shorting ring having plural segmented areas therein;
   plural, elongate rotor bars, each electrically connected to a segmented area of said shorting ring, with the segmented areas located on each end of said rotor bar;
   shunting means selectively electrically connectable to said segmented shorting ring;
   whereby said shunting means is constructed and arranged to selectively alter the current path within said shorting ring.

2. The rotor cage assembly of claim 1 wherein said shunting means is electrically disconnectable from said segmented shorting ring, thereby to provide a high resistance current path for circulating cage currents through the rotor steel.

3. The rotor cage assembly of claim 1, wherein said shunting means is electrically connectable to said segmented shorting ring to provide a low resistance current path for circulating cage currents through said shunting means.

4. The rotor cage assembly of claim 2 or 3 wherein said shunting means and said segmented shorting ring are constructed and arranged to provide multiple resistance values for the cage assembly while in operation.

5. The rotor cage assembly of claim 1 wherein said segmented shorting ring includes a kerf located between adjacent segmented areas, wherein said kerf extends through said shorting ring to said rotor steel.

6. The rotor cage assembly of claim 1 wherein said shunting means includes a mechanical shunting means for shunting said segmented shorting ring.

7. The rotor cage assembly of claim 6 wherein said mechanical shunting means includes a shunt member which is actuated by a moving mass.

8. The rotor cage assembly of claim 7 wherein said segmented shorting ring includes a conductive, conical surface against which said shunt member communicates.

9. The rotor cage assembly of claim 1 wherein said segmented shorting ring includes a conductive surface and wherein said shunting means includes a solid state switching device which communicates with said conductive surface.

10. The rotor cage assembly of claim 1 which includes plural segmented shorting rings, and wherein said shunting means is constructed and arranged to provide incremental reductions in cage resistance.

11. The rotor cage assembly of claim 10 wherein a plurality of said mechanical shunt rings are brought into electrical contact incrementally with said segmented shorting rings.

12. A rotor cage assembly in accordance with claim 10 wherein a plurality of solid state means are brought into electrical contact incrementally with said segmented shorting rings.

13. In a rotor cage assembly of an alternating current motor operating in conjunction with a rotor and rotor shaft, a reduced current starting mechanism comprising:
   a segmented shorting ring having plural segmented areas therein;
   plural, elongate rotor bars, each electrically connected to a segmented area of said shorting ring, with the segmented areas located on each end of said rotor bar;
   shunting means including:
   a shunt ring constructed and arranged to selectively provide an electrical contact with said segmented areas;
   a mass carried on and rotatable with the rotor shaft which is rotationally unconstrained in relationship to said rotor shaft, and which is frictionally driven by the rotor shaft;
   whereby said mass actuates said shunt ring as the angular velocity of said mass increases, and wherein the angular velocity of said mass reaches maximum angular velocity at a point in time after said rotor shaft attains maximum operating speed.

14. The reduced current starting mechanism of claim 13 wherein said mass actuates said shunt ring from a single location on the rotor shaft by mechanical communicating means located between said shunting means and said mass.

15. The reduced current starting mechanism of claim 13 which further includes restraining means to restrict movement of said mass.

16. In a rotor cage assembly of an alternating current motor operating in conjunction with a rotor, a reduced current starting mechanism comprising:
   a segmented shorting ring having plural segmented areas therein;

plural, elongate rotor bars, each electrically connected to a segmented area of said shorting ring, with the segmented areas located on each end of said rotor bar;

shunting means including:

a conductive element;

solid state switching means located between said segmented shorting rings and said conductive element; and means for activating said switching means;

whereby said segmented shorting ring segmented areas become electrically common when said solid state switching means is activated, thereby altering the current path within the rotor cage assembly.

17. The reduced current starting mechanism of claim 16 wherein said switching means includes: exciter coil means for providing control voltages for said solid state switching means and electric control means, wherein said exciter coil is energized by the rotating magnetic field produced by stator winding of the motor and said electric control means provides control voltage for said solid state switching means, which control voltage is relative to the required voltage potential limits for the solid state switching means and relative to the required switching intervals therefore.

18. The reduced current starting mechanism of claim 17 wherein said solid state switching means includes at least one triac.

19. The reduced current starting mechanism of claim 17 wherein said solid state switching mechanism includes a solid state shunt ring assembly.

20. The reduced current starting mechanism of claim 17 wherein said exciter coil means include at least one coil which is arranged circumferentially on an armature steel member.

21. The reduced current starting mechanism of claim 17 wherein said exciter coil means includes at least one coil, which is constructed and arranged such that the magnetic field cutting across said exciter coil means is that generated by the stator windings of the motor.

22. The reduced current starting mechanism of claim 16 which includes carrier voltage means for controlling the solid state switching means such that a controlled voltage is less than a minimum forward voltage requirement of said solid state switching device, said carrier voltage means including:

a carrier voltage coil for generating a voltage potential sufficient to overcome a minimum forward voltage requirement of said solid state switching means and for providing an electrically conductive path which is parallel to said solid state switching means between said shunt means and said segmented shorting rings, wherein the voltage potential is higher than the minimum forward voltage requirement of said solid state switching means.

* * * * *